No. 728,872. PATENTED MAY 26, 1903.
J. CUMMINGS.
VEHICLE.
APPLICATION FILED JUNE 2, 1902.
NO MODEL.
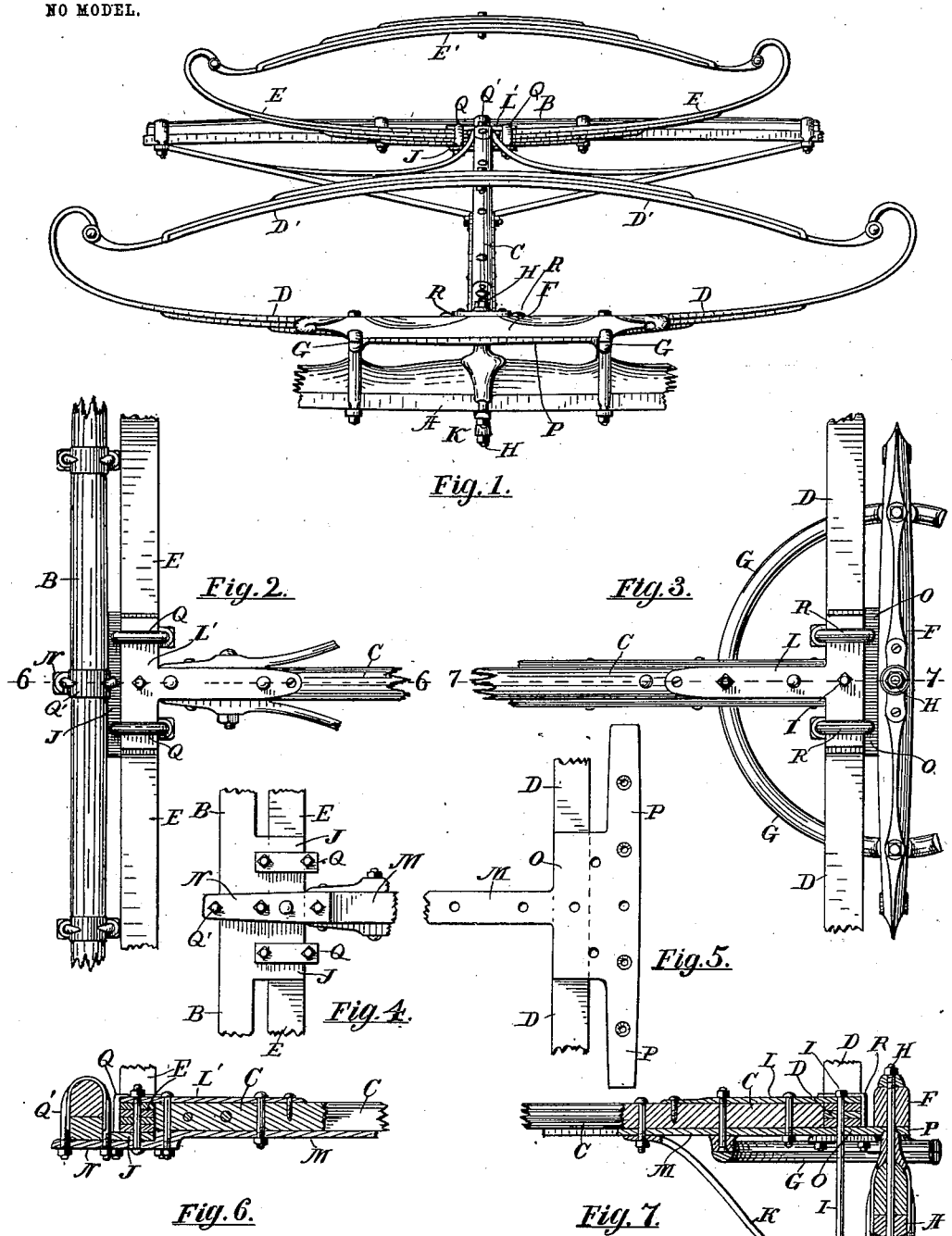
Witnesses
Palmer A. Jones.
Jennie M. Sloane
INVENTOR:
John Cummings
By Luther V. Moulton
Attorney No. 728,872. Patented May 26, 1903.

UNITED STATES PATENT OFFICE.

JOHN CUMMINGS, OF GRAND RAPIDS, MICHIGAN, ASSIGNOR OF ONE-HALF TO ALFRED D. RATHBONE, JR., OF GRAND RAPIDS, MICHIGAN.

VEHICLE.

SPECIFICATION forming part of Letters Patent No. 728,872, dated May 26, 1903.

Application filed June 2, 1902. Serial No. 109,932. (No model.)

*To all whom it may concern:*

Be it known that I, JOHN CUMMINGS, a citizen of the United States, residing at Grand Rapids, in the county of Kent and State of Michigan, have invented certain new and useful Improvements in Vehicles; and I do hereby declare the following to be a full, clear, and exact description of the invention, such as will enable others skilled in the art to which it appertains to make and use the same.

My invention relates to improvements in vehicles, and more especially to carriages or buggies having a body mounted upon springs; and its object is to provide a simple and durable construction, to provide improved means for securing the reach to the rear axle and head-block and for securing and supporting the springs in place, to prevent detachment of the front axle in the event of breakage of the king-bolt, to simplify and improve the construction of the springs, and to provide the device with certain new and useful features hereinafter more fully described, and particularly pointed out in the claims.

My device consists, essentially, in the novel construction and arrangement of the parts whereby the springs are supported between the axles and preferably in the plane of the reach and partially by the same and in various combinations and arrangements of parts, as hereinafter more fully described, reference being had to the accompanying drawings, in which—

Figure 1 is a front view of a portion of a vehicle embodying my invention; Fig. 2, an enlarged plan of a portion of the rear axle and adjacent parts. Fig. 3 is the same of the head-block and adjacent parts; Fig. 4, an inverted plan of a portion of Fig. 2; Fig. 5, an inverted plan of a portion of Fig. 3; Fig. 6, a vertical section on the line 6 6 of Fig. 2, and Fig. 7 the same on the line 7 7 of Fig. 3.

Like letters refer to like parts in all of the figures.

A represents the forward axle of the vehicle; B, the rear axle; C, the reach; D, the lower part of the forward spring; E, the lower part of the rear spring; D', the upper part of the forward spring, and E' the upper part of the rear spring.

The construction of spring herein shown is not claimed herein, but is reserved for a separate application, in accordance with the requirement of the office.

F represents the head-block, G the fifth-wheel, and H the king-bolt, all of the usual construction.

My device is especially distinguished in respect to the location of the springs upon a laterally-extended portion O of the reach-iron M and the head-block iron P. The reach C instead of extending to the head-block and rear axle abuts against the lower part of the springs D and E.

To further secure the reach and spring in place, I provide a T-shaped iron L, placed above the spring D and extending upon the upper surface of the reach C and secured in place by suitable bolts, one of which (the bolt I) extends downward and is inserted in the brace K, extending from the reach to the lower end of the king-bolt, whereby the brace is strengthened and the strain upon the king-bolt partially relieved. Also by tightening this bolt the slack due to wear is taken up, and if the king-bolt should break this bolt would prevent the detachment of the forward axle. Suitable clips R also firmly clamp the iron L, the spring D, and the extension O of the reach-iron. The rear axle B is provided at its lower side with a forwardly-extended plate J, welded thereto, upon which plate the rear spring E is securely fastened by means of clips Q Q, and a T-shaped plate L' is also placed above the spring E and held by said clips and extended forward upon the reach, to which it is secured by suitable bolts. If preferred, the plate J may be a lateral extension of the reach-iron. The reach-plate M extends along the under side of the reach and is shouldered and offset to engage the plate J and is thence extended beneath the same and the reach, as at N, and is secured to the under side of the same by a suitable clip Q'. It will thus be seen that the springs rest upon laterally-extended plates in the plane of the lower side of the reach, and corresponding laterally-extended irons engage the upper side of the springs, these extensions being firmly clamped by clips and forming braces in the angles between the ends of the reach and the head-block and the rear axle, whereby a very strong and durable structure is produced that will not break easily or get out of order.

Having thus fully described my invention, what I claim, and desire to secure by Letters Patent, is—

1. In a vehicle, a T-shaped plate extending beneath the head-block and reach and having lateral extensions, a support for the body of the vehicle attached to said extensions, a plate extending forward from the rear axle and welded thereto, a support for the body attached to said plate, and a reach connecting the said plates and abutting against the supports.

2. In a vehicle, a reach-iron adapted to be attached to the under side of the reach and head-block, a lateral extension of said iron, a forward support for the body secured to said extension, a forward extension of the rear axle, a support for the body secured thereto, and a reach extending between said supports and abutting against the same.

3. In a vehicle, springs located adjacent to the head-block and rear axle, a reach abutting against said springs at each end, a reach-iron extending beneath the reach and springs and attached at its respective ends to the head-block and rear axle and having lateral extensions beneath the springs, T-irons engaging the upper sides of the respective springs and the respective ends of the reach, clips embracing the T-irons, springs, and lateral extensions of the reach-iron.

In testimony whereof I affix my signature in presence of two witnesses.

JOHN CUMMINGS.

Witnesses:
LUTHER V. MOULTON,
JENNIE M. SLOANE.